(12) United States Patent
Barrenscheen

(10) Patent No.: US 7,032,049 B2
(45) Date of Patent: Apr. 18, 2006

(54) APPARATUS FOR RELAYING RECEIVED INTERRUPT REQUESTS

(75) Inventor: Jens Barrenscheen, München (DE)

(73) Assignee: Infineon Technologies AG, Munich (DE)

( * ) Notice: Subject to any disclaimer, the term of this patent is extended or adjusted under 35 U.S.C. 154(b) by 564 days.

(21) Appl. No.: 09/962,696

(22) Filed: Sep. 24, 2001

(65) Prior Publication Data
US 2002/0073263 A1 Jun. 13, 2002

(30) Foreign Application Priority Data
Sep. 22, 2000 (DE) .................. 100 47 185

(51) Int. Cl.
*G06F 13/24* (2006.01)
(52) U.S. Cl. ............... 710/262; 710/260; 710/263
(58) Field of Classification Search ........ 710/262–263, 710/260
See application file for complete search history.

(56) References Cited

U.S. PATENT DOCUMENTS

| | | | |
|---|---|---|---|
| 5,291,599 A * | 3/1994 | Cohen et al. ............... | 718/102 |
| 5,423,049 A * | 6/1995 | Kurihara ................... | 710/262 |
| 5,542,076 A | 7/1996 | Benson et al. | |
| 5,640,571 A | 6/1997 | Hedges et al. | |
| 5,761,453 A | 6/1998 | Anderson et al. | |
| 5,872,920 A | 2/1999 | Hausman et al. | |
| 5,881,296 A | 3/1999 | Williams et al. | |
| 5,905,913 A * | 5/1999 | Garrett et al. .............. | 710/49 |
| 5,931,936 A | 8/1999 | Chung et al. | |
| 6,065,070 A | 5/2000 | Johnson | |
| 6,065,089 A | 5/2000 | Hickerson et al. | |
| 6,115,776 A * | 9/2000 | Reid et al. .................. | 710/260 |
| 6,115,779 A * | 9/2000 | Haubursin et al. .......... | 710/262 |
| 6,185,639 B1 * | 2/2001 | Kailash et al. ............... | 710/48 |
| 6,351,785 B1 * | 2/2002 | Chen et al. .................. | 710/263 |
| 6,615,305 B1 * | 9/2003 | Olesen et al. ............... | 710/262 |

FOREIGN PATENT DOCUMENTS

| | | |
|---|---|---|
| EP | 0 752 799 A2 | 1/1997 |
| EP | 0 786 726 A2 | 7/1997 |
| EP | 0 871 307 A2 | 10/1998 |
| EP | 0 871 308 A2 | 10/1998 |
| JP | 08 129 491 A | 5/1996 |
| WO | 00/36519 | 6/2000 |
| WO | WO 00/52585 | 9/2000 |
| WO | WO 00/52586 | 9/2000 |
| WO | WO 00/52895 | 9/2000 |

* cited by examiner

*Primary Examiner*—Rehana Perveen
*Assistant Examiner*—Nimesh Patel
(74) *Attorney, Agent, or Firm*—Laurence A. Greenberg; Werner S. Stemer; Ralph E. Locher

(57) ABSTRACT

An apparatus is described which is distinguished by the fact that the apparatus does not output an interrupt request until after a plurality of interrupt requests have been received. The apparatus outputs a plurality of interrupt requests in response to an interrupt request being received, and/or the apparatus waits to output an interrupt request until it can be assumed that the operation to be initiated by a previously output interrupt request has been executed. As a result, it can be used extremely flexibly.

33 Claims, 2 Drawing Sheets

APPARATUS FOR RELAYING RECEIVED INTERRUPT REQUESTS

BACKGROUND OF THE INVENTION

Field of the Invention

The present invention relates to an apparatus for relaying received interrupt requests.

A semiconductor module contains a first module, a second module, an interrupt controller, and a bus that connects the aforementioned component parts to one another.

The first module is a module, which, at certain times or when specific events occur, must prompt the second module to effect specific actions. The prompting takes place using interrupt requests, which the first module outputs to the interrupt controller and the latter relays to the second module immediately or later in accordance with the priorities assigned to the interrupt requests.

The first module is, for example, an A/D converter, a D/A converter, or a communication controller; the second module is, for example, a CPU or a DMA controller.

The first module contains a kernel, which controls the module, and an interrupt conditioning unit. The interrupt conditioning unit is the apparatus for relaying received interrupt requests that is considered in the present case; it receives different interrupt requests from the kernel and outputs them in a manner defined in it from the first module via the bus to the interrupt controller.

The interrupt conditioning unit has four input terminals and two output terminals, the input terminals serving to accept interrupt requests originating from the kernel, and the output terminals serving to output the interrupt requests which are to be relayed to the interrupt controller. For the sake of completeness, it shall be noted that the number of input terminals and the number of output terminals can be arbitrarily larger or smaller, independently of one another. The number of input terminals preferably corresponds to the number of different interrupt requests, which the kernel can generate, and the number of output terminals preferably corresponds to the number of input terminals of the interrupt controller.

Connected downstream of each of the input terminals is a switch which defines whether or not an interrupt request signal fed to the respective input terminal is accepted by the interrupt conditioning unit. Downstream of the switches, the interrupt requests fed to the interrupt conditioning unit by the kernel are distributed between the output terminals; interrupt requests which are intended to initiate the same action in the second module are output via the same output terminals.

When configuring new semiconductor modules, it is endeavored to adopt component parts that are already used in other semiconductor modules as far as possible unchanged. However, this is possible only to a limited extent in the case of interrupt conditioning units. This is due in particular to the fact that the assignment of the interrupt requests to the output terminals of the interrupt conditioning unit must be adapted to a kernel used and to an interrupt controller used, and that the action prompted by an interrupt request in a second module, for example the volume of data which is transferred from the second module to a first module in response to an interrupt request, may vary in different second modules.

The consequence of this is that both the use of the first module in a different environment and the use of the interrupt conditioning unit in a different first module is often not possible at all, or is possible only after more or less extensive modifications of the kernel and/or interrupt conditioning unit.

This is a situation, which renders the configuration of new semiconductor modules considerably more difficult and expensive.

SUMMARY OF THE INVENTION

It is accordingly an object of the invention to provide an apparatus for relaying received interrupt requests which overcomes the above-mentioned disadvantages of the prior art devices of this general type.

With the foregoing and other objects in view there is provided, in accordance with the invention, an apparatus for relaying interrupt requests received. The apparatus contains inputs for receiving the interrupt requests and outputs connected to the inputs. The apparatus outputs an interrupt request only after receiving a plurality of the interrupt requests.

The apparatuses according to the invention are distinguished by the fact that the apparatus does not output an interrupt request until after a plurality of interrupt requests have been received, that the apparatus outputs a plurality of interrupt requests in response to an interrupt request being received, and/or that the apparatus waits to output an interrupt request until it can be assumed that the operation to be initiated by a previously output interrupt request has been executed.

The aforementioned properties enable the apparatus to be used in a wide variety of modules and systems without any, or at least without any complicated, adaptations to the components with which the apparatus and/or the module containing the latter must cooperate.

The claimed apparatuses for relaying received interrupt requests can thus be used significantly more flexibly than is the case with known apparatuses of this type.

In accordance with an added feature of the invention, a component is connected between the inputs and the outputs, the component ensures that the interrupt request is not output until after the plurality of the interrupt requests have been received by the component. The component contains a counter for counting a number of the interrupt requests received and prevents the interrupt request from being output until a specific count has been reached. The specific count is adjustable statically or dynamically as desired.

In accordance with an additional feature of the invention, the apparatus outputs a plurality of interrupt requests in response to the interrupt request being received.

In accordance with another feature of the invention, a further component is connected to the outputs and receives the interrupt requests. The further component causes the plurality of the interrupt requests to be output in response to the interrupt request being received. The further component has a counter for counting the interrupt requests output and ensures that the interrupt requests are output until a further specific count is reached. The further specific count is adjustable statically or dynamically as desired. The further component is connected downstream of the component.

In accordance with a further feature of the invention, the apparatus outputs none of the interrupt requests until a first number of the interrupt requests have been received by the component, and outputs a second number of the interrupt requests after the first number of the interrupt requests have been received.

In accordance with another added feature of the invention, the apparatus waits to output the interrupt request until it can be assumed that an operation to be initiated by a previously output interrupt request has been executed.

In accordance with another further feature of the invention, assignment units are connected between the inputs and the component. The assignment units enable a received interrupt request to be output via different ones of the outputs.

With the foregoing and other objects in view there is further provided, in accordance with the invention, an apparatus for relaying interrupt requests received. The apparatus contains inputs for receiving the interrupt requests and outputs connected to the inputs. The apparatus outputting a plurality of the interrupt requests in response to an interrupt request being received.

In accordance with an added feature of the invention, a component is connected between the inputs and the outputs. The component causes a plurality of the interrupt requests to be output in response to the interrupt request being received. The component contains a counter for counting the interrupt requests output and ensures that the interrupt requests are output until a specific count is reached.

In accordance with an additional feature of the invention, the apparatus does not output the interrupt request until after a plurality of the interrupt requests have been received.

In accordance with another feature of the invention, a further component is connected to the inputs. The further component causes the interrupt request not to be output until after a plurality of the interrupt requests have been received by the further component. The further component contains a counter for counting a number of the interrupt requests received and prevents the interrupt request from being output until a further specific count has been reached. The further component is connected upstream of the component.

In accordance with a further feature of the invention, the apparatus outputs no interrupt requests until a first number of the interrupt requests have been received, and outputs a second number of the interrupt requests after the first number of the interrupt requests have been received.

With the foregoing and other objects in view there is further provided, in accordance with the invention, an apparatus for relaying interrupt requests received. The apparatus contains inputs for receiving the interrupt requests and outputs connected to the inputs. The apparatus waits to output an interrupt request until it can be assumed that an operation to be initiated by a previously output interrupt request has been executed.

Other features which are considered as characteristic for the invention are set forth in the appended claims.

Although the invention is illustrated and described herein as embodied in an apparatus for relaying received interrupt requests, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
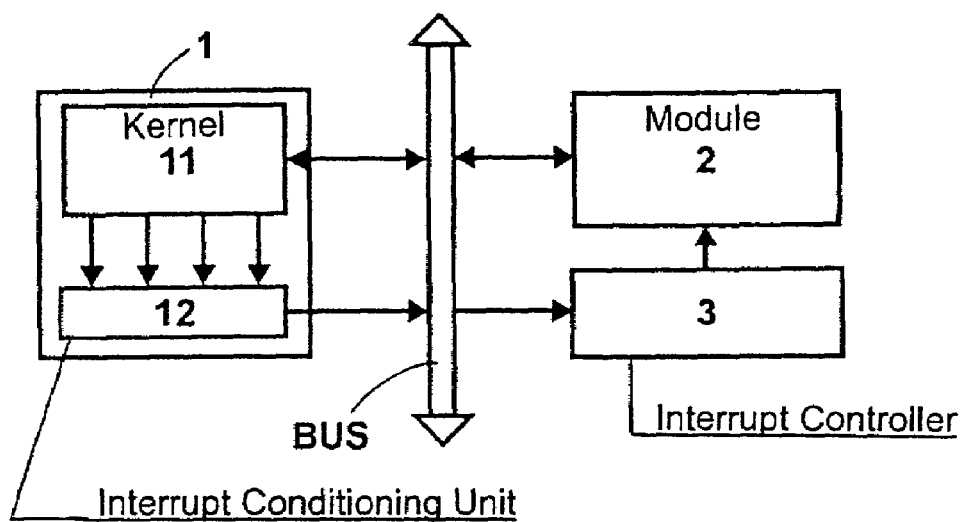
FIG. 1 is a block diagram of a configuration containing an apparatus for relaying received interrupt requests.

Referring now to the figures of the drawing in detail and first, particularly, to FIG. 1 thereof, there is shown a configuration containing an apparatus for relaying received interrupt requests.

The configuration shown is a semiconductor module such as, for example, a microcontroller or a bus controller. For the sake of completeness, it shall be pointed out that, of the configuration considered, only the component parts that are of particular interest in the present case are shown and described.

The configuration contains a first module 1, a second module 2, an interrupt controller 3, and a bus BUS that connects the aforementioned component parts to one another.

The first module 1 is a module, which, at certain times or when specific events occur, must prompt the second module 2 to effect specific actions. The prompting takes place using interrupt requests, which the first module 1 outputs to the interrupt controller 3 and the latter relays to the second module 2 immediately or later in accordance with the priorities assigned to the interrupt requests.

The first module 1 is, for example, an A/D converter, a D/A converter, or a communication controller, through which the module shown can be connected to other system components via a further bus (for example a CAN bus), not shown in FIG. 1; the second module 2 is, for example, a CPU or a DMA controller.

The first module 1 contains a kernel 11, which controls the module, and an interrupt conditioning unit 12. The interrupt conditioning unit 12 is the apparatus for relaying received interrupt requests which is considered in the present case. The interrupt conditioning unit 12 receives different interrupt requests from the kernel 11 and outputs them in a manner defined in it from the first module 1 via the bus BUS to the interrupt controller 3.

Figure 2:
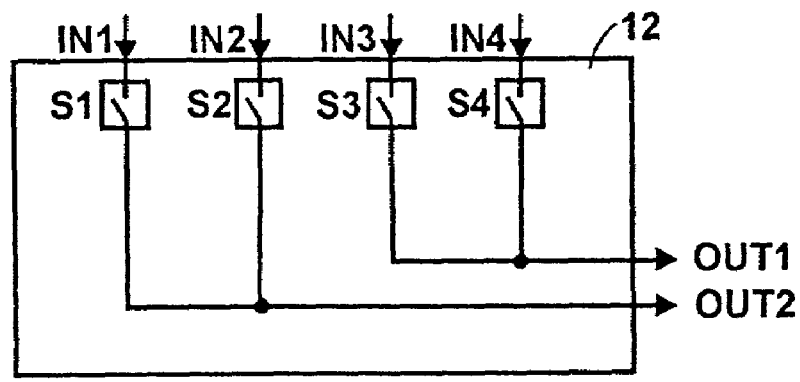
FIG. 2 is a block diagram showing the construction of a conventional apparatus for relaying received interrupt requests.

One possible construction of the interrupt conditioning unit 12 is illustrated in FIG. 2. The interrupt conditioning unit 12 shown in FIG. 2 has four input terminals IN1 to IN4 and two output terminals OUT1 and OUT2, the input terminals IN1 to IN4 serving to accept interrupt requests originating from the kernel 11, and the output terminals OUT1 and OUT2 serving to output the interrupt requests which are to be relayed to the interrupt controller 3. For the sake of completeness, it shall be noted that the number of input terminals and the number of output terminals can be arbitrarily larger or smaller, independently of one another. The number of input terminals preferably corresponds to the number of different interrupt requests, which the kernel 11 can generate, and the number of output terminals preferably corresponds to the number of input terminals of the interrupt controller 3.

Connected downstream of each of the input terminals IN1 to IN4 is a switch which defines whether or not an interrupt request signal fed to the respective input terminal is accepted by the interrupt conditioning unit 12. The switches, which can be controlled by the kernel 11 or the interrupt conditioning unit 12, are designated by the reference symbols S1 to S4 in FIG. 2. Downstream of the switches S1 to S4, the interrupt requests fed to the interrupt conditioning unit 12 by the kernel 11 are distributed between the output terminals OUT1 and OUT2. Interrupt requests which are intended to initiate the same action in the second module 2 are output via the same output terminals OUT1 and OUT2.

When configuring new semiconductor modules, it is endeavored to adopt component parts that are already used in other semiconductor modules as far as possible unchanged. However, this is possible only to a limited extent in the case of the interrupt conditioning unit 12. This is due in particular to the fact that the assignment of the interrupt requests to the output terminals of the interrupt conditioning unit 12 must be adapted to the kernel 11 used and to the interrupt controller 3 used, and that the action prompted by an interrupt request in the second module 2, for example the volume of data which is transferred from the second module 2 to the first module in response to an interrupt request, may vary in different second modules 2.

The consequence of this is that both the use of the first module 1 in a different environment and the use of the interrupt conditioning unit 12 in a different first module is often not possible at all, or is possible only after more or less extensive modifications of the kernel 11 and/or interrupt conditioning unit 12.

This is a situation, which renders the configuration of new semiconductor modules considerably more difficult and expensive.

The apparatuses for relaying received interrupt requests that are described below are configured for use as the interrupt conditioning unit 12 of the configuration shown in FIG. 1; however, they can also be used in any other configurations.

The interrupt conditioning units described below have the same function as, or a similar function to, the conventional interrupt conditioning unit 12 described in the introduction with reference to FIG. 2. In other words, they serve for handling, according to specific specifications, interrupt requests generated within the module 1 containing the interrupt conditioning unit 12, and for outputting them from the module 1.

Figure 3:
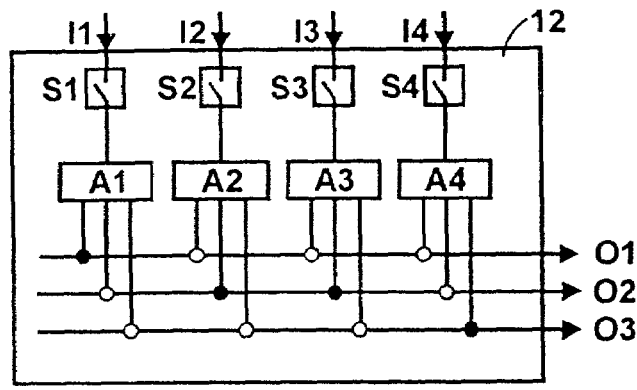
FIGS. 3 and 4 are block diagrams showing apparatuses for relaying received interrupt requests which can be used more flexibly according to the invention.

The first of these interrupt conditioning units 12 is illustrated in FIG. 3.

The interrupt conditioning unit 12 shown in FIG. 3 has four input terminals I1 to I4 and three output terminals O1 to O3, the input terminals I1 to I4 (like the input terminals IN1 to IN4 of the interrupt conditioning unit 12 in accordance with FIG. 2) serving to feed in interrupt requests originating from the kernel 11, and the output terminals O1 to O3 (like the output terminals OUT1 and OUT2 of the interrupt conditioning unit in accordance with FIG. 2) serving to output the interrupt requests that are to be relayed to the interrupt controller 3. For the sake of completeness, it shall be noted that in the interrupt conditioning unit 12, too, the number of input terminals and the number of output terminals can be arbitrarily larger or smaller, independently of one another.

Connected downstream of each of the input terminals I1 to I4 is a switch which defines whether or not an interrupt request signal fed to the respective input terminal is accepted by the interrupt conditioning unit. The switches are designated by the reference symbols S1 to S4 in FIG. 3 and correspond to the switches—designated by the same reference symbols—of the interrupt conditioning unit in accordance with FIG. 2. Connected downstream of the switches S1 to S4 are assignment units A1 to A4, which can define as desired whether an interrupt request signal arriving at them is intended to be output via the first output terminal O1, the second output terminal O2 or the third output terminal O3. In the example considered, the assignment of the individual interrupt requests to the output terminals via which they are output is adjustable as desired by use of assignment data (interrupt node pointer) stored or set in the assignment units A1 to A4, as a result of which it can be defined as desired without changing the construction of the interrupt conditioning unit 12. The assignment can preferably be varied dynamically (during operation of the interrupt conditioning unit 12); as a result, the interrupt conditioning unit 12 can be adapted even better to the conditions prevailing in each case. In the example illustrated in FIG. 3, the assignment is defined in such a way that interrupt requests input via the input terminal I1 are output via the output terminal O1, that interrupt requests input via the input terminals I2 and I3 are output via the output terminal O2, and that interrupt requests input via the input terminal I4 are output via the output terminal O3.

Figure 4:
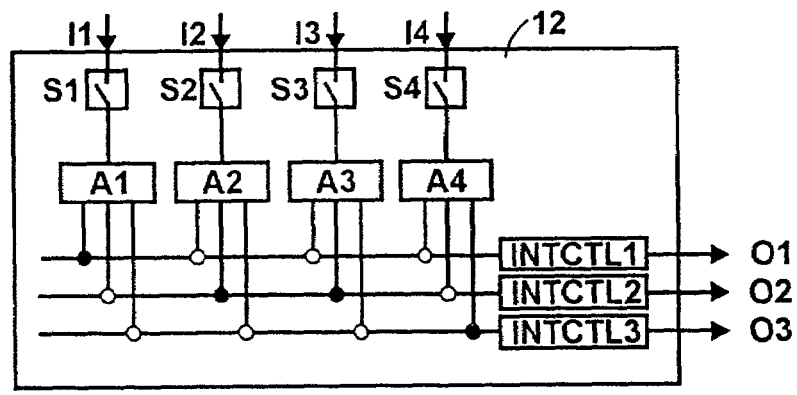

The interrupt conditioning unit 12 can be used even more flexibly if it is constructed in the manner shown in FIG. 4. The interrupt conditioning unit 12 shown in FIG. 4 is based on the interrupt conditioning unit 12 shown in FIG. 3 but additionally has adapting units INTCTL1–INTCTL3 upstream of the output terminals O1 to O3, which adapting units INTCTL1–INTCTL3 ensure that the interrupt conditioning unit 12 does not output an interrupt request until after a plurality of interrupt requests have been received, that the interrupt conditioning unit 12 outputs a plurality of interrupt requests in response to an interrupt request being received, and/or that the interrupt conditioning unit waits to output an interrupt request until it can be assumed that the operation to be initiated by a previously output interrupt request has been executed.

The adapting units INTCTL1–INTCTL3 have an identical construction. The construction of such an adapting unit is illustrated in FIG. 5.

Figure 5:
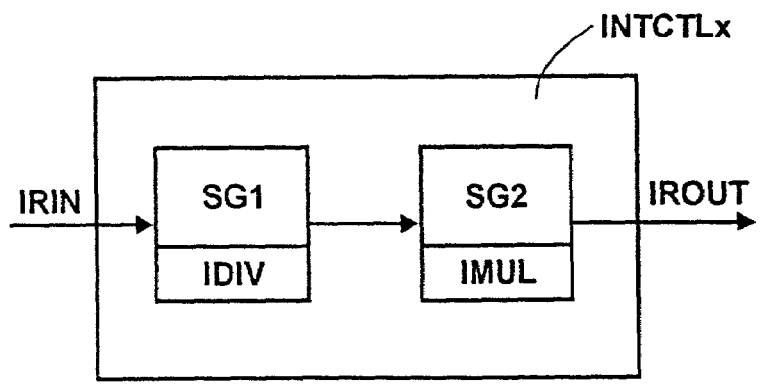
FIG. 5 is a block diagram showing the construction of one of the adapting units contained in the apparatus in accordance with FIG. 4.

In accordance with FIG. 5, the adapting unit INTCTLx has an input terminal IRIN and an output terminal IROUT and contains a first signal generating apparatus SG1, which, only in each case after a specific number of received interrupt requests, relays an interrupt request or generates a signal representing an interrupt request, and a second signal generating apparatus SG2 which is connected in series with the first signal generating apparatus SG1 and, each time an interrupt request is received, generates a specific number of signals representing interrupt requests.

In the example considered, the first signal generating apparatus SG1 and the second signal generating apparatus SG2 contain counters, in which case the counter contained in the first signal generating apparatus SG1 counts the received interrupt requests and, upon reaching a statically or dynamically adjustable count IDIV, causes an interrupt request to be relayed or a signal representing an interrupt request to be generated, and starts to count from 0 again. The counter contained in the second signal generating apparatus SG2 counts the interrupt requests which, after the reception of an interrupt request, are thereupon generated in the second signal generating apparatus SG2 and output, and, upon reaching a statically or dynamically adjustable count IMUL, causes the second signal generating apparatus SG2 not to generate and output any further interrupt requests, and starts to count from 0 again.

The first signal generating apparatus SG1 and the second signal generating apparatus SG2 enable the interrupt requests output by the kernel 11 to be converted into an arbitrary other sequence of interrupt requests.

The first signal generating apparatus SG1 proves to be advantageous, for example, if data provided for fetching the kernel 11 of the first module 1 are intended or have to be fetched and/or processed further in packets by the second module 2, but the kernel 11 generates an interrupt request for each individual datum which it provides for fetching.

The second signal generating apparatus SG2 proves to be advantageous, for example, if the kernel 11 of the first module 1 provides data packets for fetching which, for example owing to an excessively small bus width, can be fetched by the second module 2 only by use of a plurality of successive operations that have to be initiated by dedicated interrupt requests, but the kernel 11 generates only a single interrupt request per data packet.

The possibilities afforded by the first signal generating apparatus SG1 and the second signal generating apparatus SG2 can also be combined. As an example, an application shall be mentioned in which data for fetching by the second module 2 are provided in a buffer of the kernel 11 of the first module 1, in which case the kernel 11 writes to the buffer byte by byte and the kernel outputs an interrupt request each time a byte has been written. The buffer is permitted to be read only when 12 bytes are stored in the buffer. The buffer is read by the second module 2 in units of bytes and the read-out of each byte must be initiated by a dedicated interrupt request.

This can be achieved by programming IDIV and IMUL with 12. IDIV=12 has the effect that the first interrupt request of the kernel 11 which reaches the second signal generating apparatus SG2 is the interrupt request which is output by the kernel 11 after the 12th byte has been written to the buffer. IMUL=12 has the effect that the second signal generating apparatus SG2 generates and outputs 12 interrupt requests after an interrupt request has been received.

For the case where the second module 2 reads out the data in units of two bytes from the buffer, IDIV would have to be programmed with 12 and IMUL with 6; for the case where the second module 2 reads out the data in units of four bytes from the buffer, IDIV would have to be programmed with 12 and IMUL with 3.

It is apparent from the above explanations that the signal generating apparatuses SG1 and SG2 can handle arbitrary constellations.

For the sake of completeness, it shall be noted that the above-mentioned counts IDIV and IMUL can also be 1. In this case, the first signal generating apparatus SG1 and the second signal generating apparatus SG2 do not take effect.

It should be clear that there is no restriction in respect of constructing and disposing the adapting units in the manner shown in FIG. 5 and described with reference thereto; a multiplicity of other possible realizations is conceivable. By way of example, it would be conceivable to equip the adapting units only with the first signal processing apparatus SG1 or only with the second signal processing apparatus SG2 or corresponding other devices. Moreover, the adapting units can be disposed at another location within the interrupt conditioning unit, for example upstream of the switches S1 to S4. Furthermore, for example in order to preclude mutual interference of the interrupt requests, it may be provided that the adapting units temporarily change the position of the switches S1 to S4, temporarily reprogram the assignment units A1 to A4, and/or temporarily store interrupt requests and relay them later.

A very advantageous effect may also be manifested if the interrupt conditioning unit 12, prior to the outputting of an interrupt request, checks whether the interrupt request output last via the same output terminal, more precisely the operation to be initiated by the interrupt request, has actually been executed, and outputs the next interrupt request only when it has been ascertained that the operation to be initiated by the previous interrupt request has been executed. For the case where the operation to be executed consists in writing data to the first unit 1 or reading them from the unit, this check could be effected using the read/write signal which must be fed to the memory of the first module 1 that is to be read from or written to, in order that the memory can be read from or written to.

In the case of the interrupt conditioning unit 12 shown in FIG. 5, this signal or another signal which can be used to check the execution of the operation to be initiated by the previous interrupt request is preferably fed to the second signal generating apparatus SG2 and checked in the latter.

Such a check may also prove to be advantageous in interrupt conditioning units other than the interrupt conditioning unit 12 shown in FIGS. 4 and 5 and described with reference thereto, for example also in the interrupt conditioning units shown in FIGS. 2 and 3 and described with reference thereto.

Furthermore, there is also no restriction in respect of using the adapting units INTCTLx in an interrupt conditioning unit 12 of the type shown in FIG. 3. The assignment units A1–A4, the adapting units INTCTLx, and the outputting of interrupt requests that is effected depending on the execution of a previously output interrupt request can be used individually or in arbitrary combinations in arbitrary interrupt conditioning units.

The above-described apparatus for relaying received interrupt requests can be used independently of the details of the practical realization in a wide variety of modules and systems and even makes it possible to dispense with mutual adaptation of the kernel 11 of the first module 1 and of the second module 2.

I claim:

1. An apparatus receiving interrupt requests and outputting interrupt requests in response to the received interrupt requests, comprising:

inputs for receiving the interrupt requests;

outputs being connected to said inputs, the apparatus outputting an interrupt request only after receiving a plurality of the interrupt requests;

a component connected between said inputs and said outputs, said component ensuring that the interrupt request is not output until after the plurality of the interrupt requests have been received by said component, said component containing a counter for counting a number of the interrupt requests received and preventing the interrupt request from being output until a specific count has been reached;

a further component being connected to said outputs and receiving the interrupt requests output by said component, said further component outputting one or more interrupt requests in response to each interrupt request being received, said further component having a counter for counting the interrupt requests output and ensuring that the interrupt requests are output until a further specific count is reached; and the apparatus outputting the interrupt request after checking that an operation initiated by a previously output interrupt request has been executed.

2. The apparatus according to claim 1, wherein the specific count is adjustable statically or dynamically as desired.

3. The apparatus according to claim 1, wherein the apparatus outputs a plurality of the interrupt requests in response to a specific interrupt request being received.

4. The apparatus according to claim 1, wherein the apparatus outputs no interrupt requests until a first number of the interrupt requests have been received by said component, and outputs a second number of the interrupt requests after the first number of the interrupt requests have been received.

5. The apparatus according to claim 4, wherein said further component is connected downstream of said component.

6. The apparatus according to claim 5, including assignment units connected between said inputs and said component, said assignment units enabling a received interrupt request to be output via different ones of said outputs.

7. An apparatus receiving interrupt requests and outputting interrupt requests in response to the received interrupt requests, comprising:
   inputs for receiving the interrupt requests;
   outputs being connected to said inputs, the apparatus outputting a plurality of the interrupt requests in response to a single interrupt request being received; and
   the apparatus outputting the interrupt requests after checking that an operation initiated by a previously output interrupt request has been executed.

8. The apparatus according to claim 7, including a component connected between said inputs and said outputs, said component causing a plurality of the interrupt requests to be output in response to the interrupt request being received, said component containing a counter for counting the interrupt requests output and ensures that the interrupt requests are output until a specific count is reached.

9. The apparatus according to claim 8, wherein the specific count is adjustable statically or dynamically as desired.

10. The apparatus according to claim 8, wherein the apparatus does not output the interrupt request until after a plurality of the interrupt requests have been received.

11. The apparatus according to claim 10, including a further component connected to said inputs, said further component causing the interrupt request not to be output until after a plurality of interrupt requests have been received by said further component, said further component containing a counter for counting a number of the interrupt requests received and preventing the interrupt requests from being output until a further specific count has been reached.

12. The apparatus according to claim 11, wherein the further specific count is adjustable statically or dynamically as desired.

13. The apparatus according to claim 11, wherein said further component is connected upstream of said component.

14. The apparatus according to claim 11, including assignment units disposed between said further component and said inputs, said assignment units enabling a received interrupt request to be output via a different one of said outputs.

15. The apparatus according to claim 10, wherein the apparatus outputs no interrupt requests until a first number of the interrupt requests have been received, and outputs a second number of the interrupt requests after the first number of the interrupt requests have been received.

16. An apparatus receiving interrupt requests and outputting interrupt requests in response to the received interrupt requests, comprising:
   inputs for receiving the interrupt requests;
   outputs being connected to said inputs, the apparatus outputting an interrupt request after checking that an operation initiated by a previously output interrupt request has been executed;
   a component connected between said inputs and said outputs, said component ensuring that the interrupt request is not output until after the plurality of the interrupt requests have been received by said component, said component containing a counter for counting a number of the interrupt requests received and preventing the interrupt request from being output until a specific count has been reached; and
   a further component being connected to said outputs and receiving the interrupt requests output by said component, said further component outputting one or more interrupt requests in response to each interrupt request being received, said further component having a counter for counting the interrupt requests output and ensuring that the interrupt requests are output until a further specific count is reached.

17. A method for receiving interrupt requests and outputting interrupt requests in response to the received interrupt requests, which comprises the steps of:
   providing an apparatus for receiving the interrupt requests;
   the apparatus outputting an interrupt request only after receiving a plurality of the interrupt requests;
   providing the apparatus with a component for ensuring that the interrupt request is not output until after the plurality of the interrupt requests have been received, the component containing a counter for counting a number of the interrupt requests received and preventing the interrupt request from being output until a specific count has been reached;
   providing the apparatus with a further component causing one or more interrupt requests to be output in response to an interrupt request being received from said component, the further component having a counter for counting the interrupt requests output and ensuring that the interrupt requests are output until a further specific count is reached; and
   waiting to output the interrupt request until checking that an operation initiated by a previously output interrupt request has been executed.

18. The method according to claim 17, which comprises outputting from the apparatus a plurality of the interrupt requests in response to a single interrupt request being received.

19. The method according to claim 17, which comprises adjusting the further specific count statically or dynamically as desired.

20. The method according to claim 17, which comprises:
   outputting from the apparatus none of the interrupt requests until a first number of the interrupt requests have been received; and
   outputting from the apparatus a second number of the interrupt requests after the first number of the interrupt requests have been received.

21. The method according to claim 17, which comprises connecting the further component downstream of the component.

22. The method according to claim 21, which comprises providing the apparatus with assignment units, the assignment units enabling a received interrupt request to be output via different outputs.

23. A method for receiving interrupt requests and outputting interrupt requests in response to the received interrupt requests, which comprises the steps of:
- providing an apparatus for receiving the interrupt requests;
- the apparatus outputting one or more interrupt requests in response to a single interrupt request being received; and
- waiting to output an interrupt request until checking that an operation initiated by a previously output interrupt request has been executed.

24. The method according to claim 23, which comprises providing the apparatus with a component for causing a plurality of the interrupt requests to be output in response to a single interrupt request being received, the component containing a counter for counting the interrupt requests output and ensuring that the interrupt requests are output until a specific count is reached.

25. The method according to claim 24, which comprises adjusting the specific count statically or dynamically as desired.

26. The method according to claim 24, which comprises preventing the outputting of an interrupt request until after a plurality of the interrupt requests have been received.

27. The method according to claim 26, which comprises providing the apparatus with a further component for causing the interrupt requests not to be output until after a plurality of the interrupt requests have been received, the further component containing a counter for counting a number of the interrupt requests received and preventing the interrupt request from being output until a further specific count has been reached.

28. The method according to claim 27, which comprises adjusting the further specific count statically or dynamically as desired.

29. The method according to claim 27, which comprises connecting the further component upstream of the component in the apparatus.

30. The method according to claim 29, which comprises providing the apparatus with assignment units for enabling an interrupt request received to be output via a different output.

31. The method according to claim 26, which comprises outputting none of the interrupt requests until a first number of the interrupt requests have been received, and outputting a second number of the interrupt requests after the first number of interrupt requests have been received.

32. A method for receiving interrupt requests and outputting interrupt requests in response to the received interrupt requests, which comprises the steps of waiting to output an interrupt request until checking that an operation initiated by a previously output interrupt request has been executed; and providing the apparatus with a component for causing the interrupt request not to be output until after a plurality of the interrupt requests have been received, the component containing a counter for counting a number of the interrupt requests received and preventing the interrupt request from being output until a specific count has been reached.

33. An apparatus for receiving interrupt requests and outputting interrupt requests in response to the received interrupt requests, comprising:
- inputs for receiving the interrupt requests;
- outputs;
- assignment units disposed between said inputs and said outputs, said assignment units enabling a receiving interrupt request to be output by a different one of said outputs;
- a component being connected to said outputs and receiving the interrupt requests, said component causing one or more interrupt requests to be output in response to each interrupt request being received, said component having a counter for counting the interrupt requests output and ensuring that the interrupt requests are output until a specific count is reached; and
- the apparatus outputting the interrupt requests after checking that an operation to be initiated by a previously output interrupt request has been executed.

* * * * *